United States Patent
Daye et al.

(10) Patent No.: US 9,420,107 B2
(45) Date of Patent: *Aug. 16, 2016

(54) SERVICE REQUEST ROUTING USING PASSIVE SKILL CERTIFICATION

(71) Applicant: International Business Machines Corporation, Armonk, NY (US)

(72) Inventors: Sheri G. Daye, Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,079

(22) Filed: Mar. 17, 2015

(65) Prior Publication Data

US 2015/0195408 A1 Jul. 9, 2015

Related U.S. Application Data

(63) Continuation of application No. 12/604,659, filed on Oct. 23, 2009, now Pat. No. 9,049,298.

(51) Int. Cl.
*H04M 3/00* (2006.01)
*H04M 3/523* (2006.01)
*H04L 12/28* (2006.01)

(52) U.S. Cl.
CPC .................................. *H04M 3/5233* (2013.01)

(58) Field of Classification Search
CPC ............ H04M 3/5175; H04M 3/5233; H04M 3/5232; H04M 3/5183; H04M 3/51; H04M 3/5166; H04M 3/523; H04M 1/72547; H04M 2203/402; H04L 41/22; H04L 12/589; H04L 41/5064; G06Q 30/016; G06Q 10/063112

USPC ............ 379/265.01, 265.02, 265.03, 265.05, 379/265.06, 265.11, 265.12, 265.13
See application file for complete search history.

(56) References Cited

U.S. PATENT DOCUMENTS

| | | | |
|---|---|---|---|
| 6,453,038 B1 * | 9/2002 | McFarlane | H04M 3/5233 379/265.05 |
| 6,704,410 B1 | 3/2004 | McFarlane et al. | |
| 6,829,348 B1 * | 12/2004 | Schroeder | G06Q 30/02 379/265.02 |

(Continued)

OTHER PUBLICATIONS

Daye et al., "Service Request Routing Using Passive Skill Certification", U.S. Appl. No. 12/604,659, filed Oct. 23, 2009, 40 pages.

*Primary Examiner* — Khai N Nguyen
*Assistant Examiner* — Kharye Pope
(74) *Attorney, Agent, or Firm* — Jinesh P. Patel; John Pivnichny

(57) ABSTRACT

In a data processing system coupled for communication to a plurality of agent terminals, a message is received indicating that an agent associated with the agent terminal handled a service request utilizing a skill in which the agent is not indicated as certified by an agent database of the data processing system. In response to receipt of the message, the data processing system updates in the agent database an agent skill record indicative of an amount of utilization of the skill by the agent in handling service requests. The data processing system compares the amount of utilization of the skill by the agent to a threshold. In response to a favorable comparison, the data processing system updates the agent skill record to indicate certification of the agent in the skill. The data processing system performs skill-based routing in a contact center by reference to the agent skill record.

20 Claims, 12 Drawing Sheets

(56) References Cited

U.S. PATENT DOCUMENTS

| | | | |
|---|---|---|---|
| 6,938,048 B1 * | 8/2005 | Jilk | G06Q 10/06 705/7.14 |
| 7,072,966 B1 * | 7/2006 | Benjamin | H04M 3/5233 379/265.12 |
| 7,110,525 B1 | 9/2006 | Heller et al. | |
| 7,158,628 B2 | 1/2007 | McConnell et al. | |
| 7,936,867 B1 | 5/2011 | Hill et al. | |
| 8,731,177 B1 * | 5/2014 | Kiefhaber | H04M 3/5175 379/265.09 |
| 2003/0037113 A1 | 2/2003 | Petrovykh | |
| 2005/0043986 A1 * | 2/2005 | McConnell | H04M 3/5232 379/265.02 |
| 2006/0062374 A1 * | 3/2006 | Gupta | H04M 3/5232 379/265.06 |
| 2006/0153356 A1 | 7/2006 | Sisselman et al. | |
| 2006/0256953 A1 * | 11/2006 | Pulaski | H04M 3/5175 379/265.06 |
| 2007/0064912 A1 * | 3/2007 | Kagan | H04M 3/5232 379/265.1 |
| 2008/0095355 A1 * | 4/2008 | Mahalaha | H04M 3/5233 379/265.09 |
| 2008/0147470 A1 * | 6/2008 | Johri | G06Q 10/063114 379/265.11 |
| 2009/0110182 A1 * | 4/2009 | Knight, Jr. | H04M 3/5233 379/265.12 |
| 2010/0266115 A1 | 10/2010 | Fedorov et al. | |

* cited by examiner

SERVICE REQUEST ROUTING USING PASSIVE SKILL CERTIFICATION

BACKGROUND OF THE INVENTION

1. Technical Field

The present invention relates in general to the field of contact centers, and in particular to routing service requests in a contact center. Still more particularly, the present invention relates to a contact center routing service requests based at least in part upon passive skill certification of agents.

2. Description of the Related Art

Enterprises may be generally defined as organizations that provide products, which can include goods and/or services. Enterprises include private and public businesses, as well as governmental, educational and charitable institutions. Users, purchasers and consumers of products (including potential users, purchasers and consumers) often have questions regarding products, product usage and product cost. For example, a prospective student may have questions about a particular course offered by an educational institution, a purchaser of a computer system may have questions regarding configuring hardware and/or software of the computer system, or a company may have questions about technical specifications of a contract that has been let or is open for bids. Such examples are not intended to be exhaustive, but rather to illustrate the wide diversity of questions that may be received by enterprises.

To address such questions, enterprises frequently establish or contract with one or more other enterprises to establish a contact center to handle at least the routing of service requests submitted by users, purchasers and consumers, and perhaps provision of one or more services in response to the service requests. In current contact centers, a high percentage of service requests are selectively routed in an automated fashion to agents each providing a set of predefined services. For example, a contact center may employ an Interactive Voice Response (IVR) application that, in response to receipt of a service request, presents diagnostic questions and then routes the service request to an agent having the appropriate skill set based upon the answers provided to the diagnostic questions.

SUMMARY OF THE INVENTION

A conventional IVR application typically assigns particular skill sets to particular agents based upon inputs signifying the agents' completion of off-hours training classes to achieve certain skill certifications. For example, in a conventional banking contact center, some agents will have skill certification in loan processing, while others have skill certification in account setup and features, while still others have skill certification in credit card accounts. Because the value of an agent's compensation package is often determined based upon the number of service requests that the agent handles to completion, agents in contact centers are financially incentivized to handle service requests that request services outside of the fields in which the IVR application indicates the agents are certified. Consequently, agents aggressive in their provision of service may attain a certain level of on-the-job training.

Conventional contact center systems do not have any way of taking into account skills acquired by on-the-job training. Consequently, to obtain higher value skills sets, agents are forced to miss work to attend training classes and take certification exams, meaning that the contact center operator must hire additional backup agents to substitute for agents absent for skills training.

In one embodiment, in a data processing system coupled for communication to a plurality of agent terminals, a message is received indicating that an agent associated with the agent terminal handled a service request utilizing a skill in which the agent is not indicated as certified by an agent database of the data processing system. In response to receipt of the message, the data processing system updates in the agent database an agent skill record indicative of an amount of utilization of the skill by the agent in handling service requests. The data processing system compares the amount of utilization of the skill by the agent to a threshold. In response to a favorable comparison, the data processing system updates the agent skill record to indicate certification of the agent in the skill The data processing system performs skill-based routing in a contact center by reference to the agent skill record.

DETAILED DESCRIPTION OF THE PREFERRED EMBODIMENT

Figure 1:
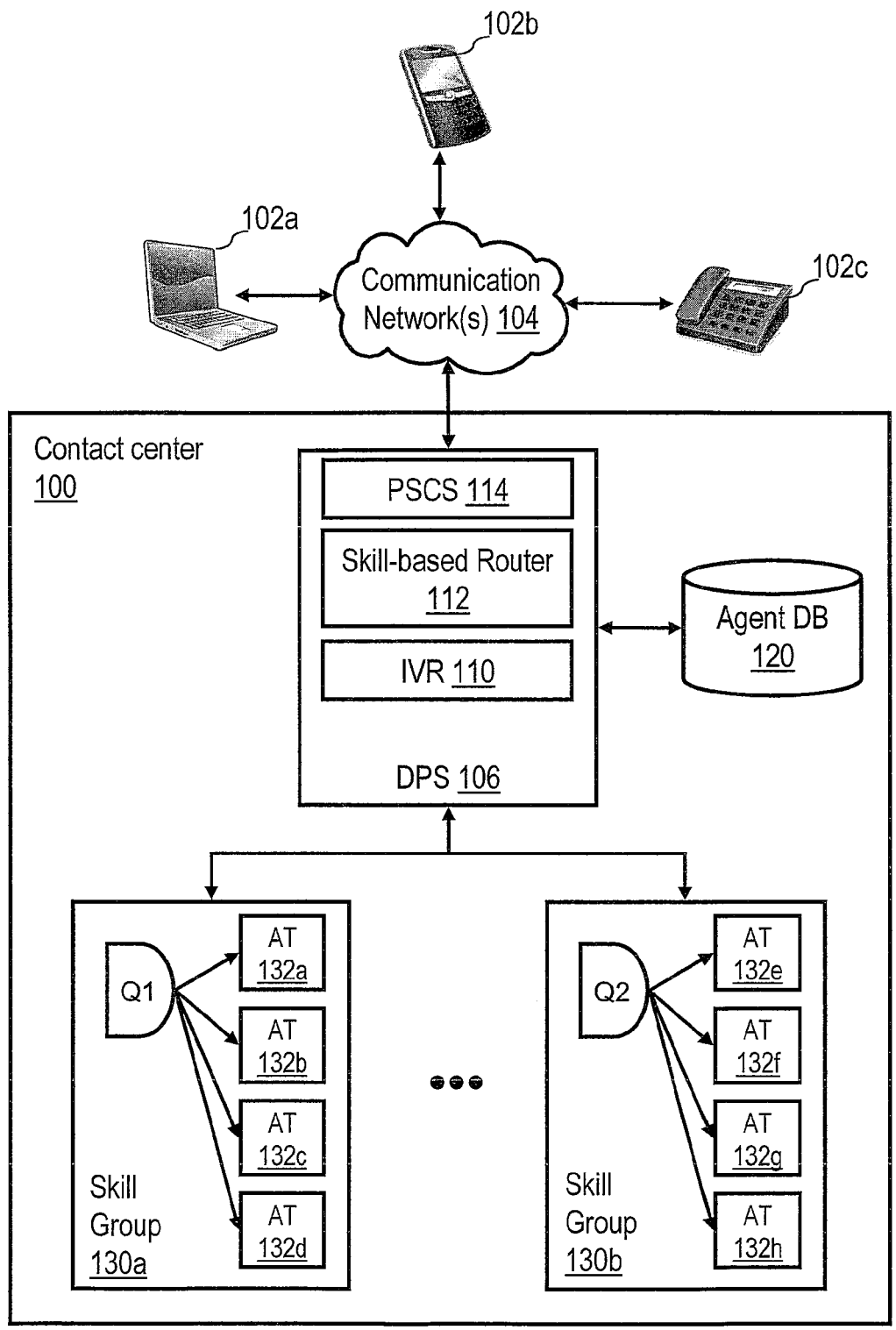
FIG. 1 depicts an exemplary contact center environment in accordance with one embodiment.

With reference now to FIG. 1, there is illustrated a high level diagram of an exemplary contact center environment in accordance with one embodiment. As shown, the contact center environment includes a contact center 100 coupled for communication to one or more circuit switched or packet switched communication networks 104, such as wired or wireless local area or wide area network(s), cellular telephony network(s), and/or public switched telephone network(s) (PSTNs). Thus, contact center 100 may communicate with requester devices 102a-102c (e.g., computer systems, mobile telephones, smart phones, landline telephones) via communication network(s) 104. The communication between requester devices 102-102c and contact center 100 can include voice communication, for example, via a PSTN or voice over Internet Protocol (VoIP) connection, and/or data communication, for example, via instant messaging, Simple Mail Transport Protocol (SMTP) or Hypertext Transfer Protocol (HTTP). In general, the communication between contact center 100 and requester devices 102 includes the transmission of service requests from requester devices 102 to contact center 100 and the transmission of service responses from contact center 100 to requester devices 102.

Still referring to FIG. 1, contact center 100 includes a data processing system 106, which may include one or more physical computer systems including processing units, communication hardware and data storage. As indicated, data processing system 106 can include, in addition to the possibly conventional processing, data storage and communication hardware, an interactive voice response (IVR) system 110. IVR system 110, which may comprise hardware and/or software components, provides automated voice interaction with a requester that establishes voice communication via one of requester devices 102a-102c, Thus, for example, IVR 110 may answer VoIP or PSTN calls and gather diagnostic information regarding a service request, as is known in the art.

Data processing system 106 also includes a skill-based router 112 that routes service requests to agents for servicing. As indicated by its name, skill-based router 112 routes service requests to agents based, at least in part, on the skills associated with the agents by individualized agent skill records comprising agent database 120. Skill-based router 112 may, of course, consider additional factors in the routing of service requests to agents, including, for example, least-cost routing techniques, prior agent-requester relationship, workload balancing, agent availability, service level agreements, request escalation, etc. In a typical embodiment, skill-based router 112 is implemented as program code executable from the data storage of data processing system 106.

As discussed further below, the skill sets associated with the agents by the agent skill records in agent database 120 are updated by a passive skill certification system (PSCS) 114 based upon service requests handled by agents utilizing skills in which the agents have not received certification. In a typical embodiment, PSCS 114 is implemented as program code executable from the data storage of data processing system 106.

Contact center 100 further includes a plurality of agent terminals 132a-132h, which are coupled for communication with data processing system 106 and which utilized by live agents to conduct data and voice communication with requester devices 102. Agent terminals 132 may be geographically distributed from data processing system 106 and may further be geographically distributed from one another. Although not required, agent terminals 132 may be logically (and possibly physically) grouped in one or more possibly intersecting skill groups, such as skill groups 130a-130b, that include agent terminals 132 of agents possessing the same or similar skill sets.

As indicated by request queues Q1 and Q2, in some cases skill-based router 112 may further route service requests to a request queue Q1 or Q2 for servicing by an agent stationed at any of agent terminals 132 in a particular skill group 130, rather than routing a request directly to a specific agent terminal 132. Service requests queued to one of queues Q1 and Q2 may thereafter be handled, for example, at the agent terminal 132 of the first available agent.

To permit timely servicing of service requests in the absence (or unavailability) of one or more agents in a given skill group 130, the agent skill records of agent database 120 may further designate one or more agents outside of a particular skill group 130 as a backup agent of that skill group 130 generally or of one or more particular primary agents in that skill group 130. Thus, for example, agent database 120 may designate an agent stationed at agent terminal 132e as a backup agent of skill group 130a generally, or as a backup agent of one or more particular primary agents in skill group 130a, such as the agent stationed at agent terminal 132a, With this arrangement, if no primary agent in skill group 130a is available to timely handle a service request, that service request may be routed to the backup agent stationed at agent terminal 132e, despite the fact that the agent stationed at agent terminal 132e is not certified in the skill or skills defining skill group 130a.

Figure 2A:
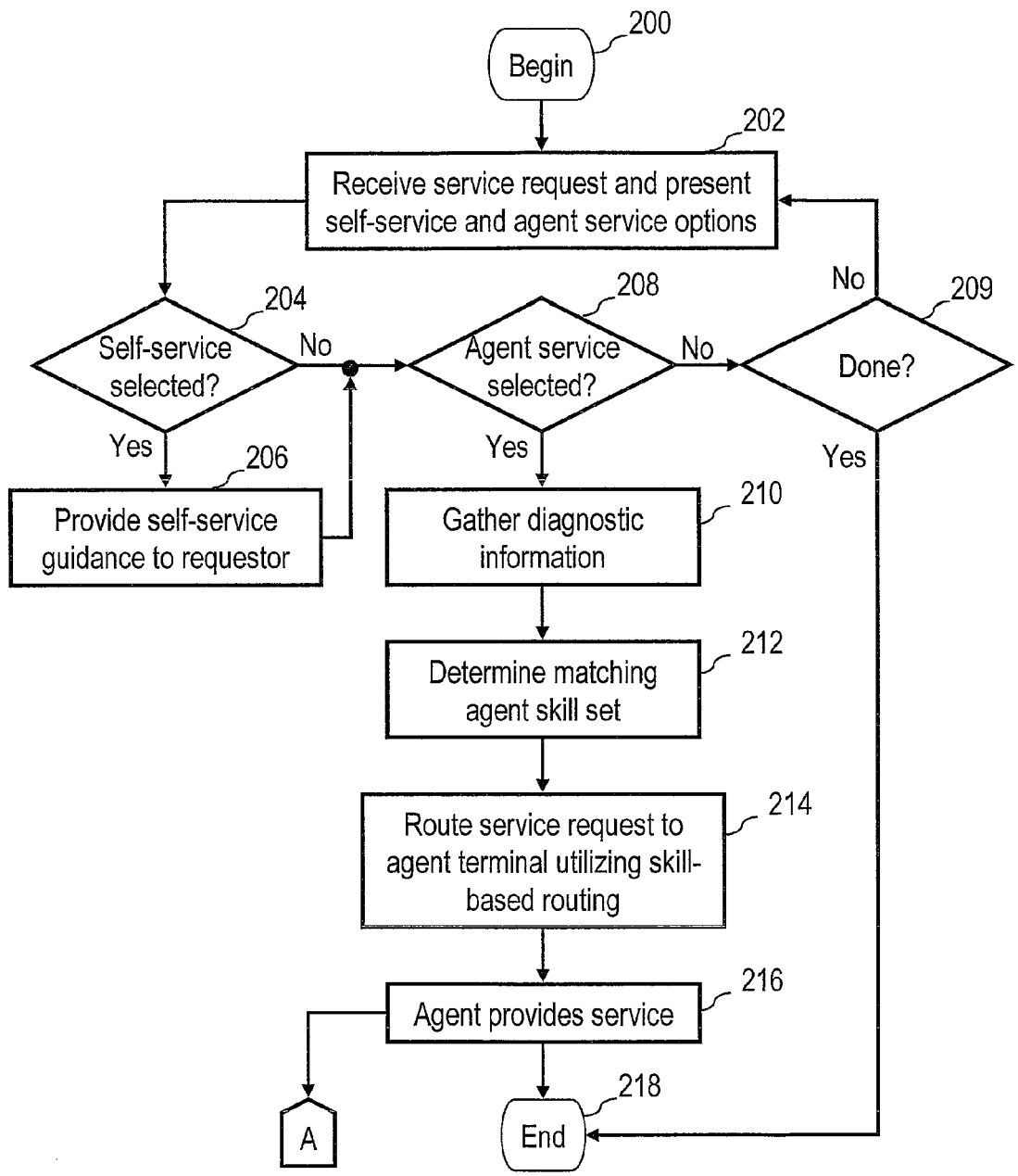
FIG. 2A illustrates servicing of a service request utilizing skill-based routing in accordance with one embodiment.

With reference now to FIG. 2A, there is illustrated a high level logical flowchart of an exemplary process by which a service request is serviced by contact center 100. The process begins at block 200 and thereafter proceeds to block 202, which illustrates data processing system 106 receiving a service request from one of requester devices 102a-102c, In response to receipt of the service request, data processing system 106 presents self-service and agent service options to the requester device 102, for example, through IVR system 110 or via a web page communicated via HTTP. As indicated at blocks 204 and 206, if data processing system 106 receives from the requester device 102 a voice or data message indicating selection of the self-service option, data processing system 106 provides self-service guidance to requester device 102, for example, through IVR system 110 or via one or more web pages communicated via HTTP. Self-service guidance is particularly suitable for handling standard service requests, such as bank balance inquiries, airline flight departure and arrival times, due dates for bills, enrollment in a corporate benefits plan, etc.

Regardless of whether the self-service option was selected, a service requester can, if desired, request agent service by transmitting selection of an agent service option from a requester device 102 to data processing system 106, as shown at block 208. If the agent service option is selected, the process proceeds from block 208 to block 210, which is described below. If, on the other hand, the agent service option is not received by data processing system 106, the service request can be terminated at block 209, for example, by the service requester ending a voice call or by terminating a web session via requester device 102. If data processing system 106 determines that the service request has been terminated without agent service, the process ends at block 218. If, however, data processing system 106 determines at block 209 that the service request has not been terminated, the process returns to block 202, which has been described.

Referring now to block 210, if agent service is requested, data processing system 106 gathers diagnostic information regarding the service request from requester device 102, for example, via IVR system 110 and/or one or more web pages transmitted to the requester device 102. Based upon the diagnostic information gathered from requester device 102, skill-based router 112 determines a skill set suitable to provide the service requested by the service request 212. At block 214, skill-based router 112 then routes the service request for servicing to an agent terminal 132 of an agent associated by agent database 120 with the skill set determined at block 212. As previously indicated, at block 214 skill-based router 112 can route the service request to a particular agent terminal 132 possessing certification in the skill set or to a queue (e.g., Q1 or Q2) of a particular skill group 130 comprising agents having certification in the skill set. Absent the availability of an agent possessing certification in the skill set, at block 214 skill-based router 112 may alternatively route the service request to backup agent outside of the skill group 130 comprising agents having certification in the skill set.

At block 216, the agent to which the service request is routed then provides the requested service via communication between the agent terminal 132 and the requester device 102. As discussed above, the communication between agent terminal 132 and requester 102 can include, for example, voice, instant messaging and/or email communication. In providing service, it is often the case that an agent is requested to provide or does provide services outside of the agent's certified skill set. For example, in the financial services industry, an agent certified in the provision of home lending services may, based upon a request of the service requester or on his own initiative, provide additional services regarding depository or credit card accounts, which are areas in which the agent is not certified. At the conclusion of the provision of service by the agent at block 216, the process in FIG. 2A ends at block 218.

Figure 2B:
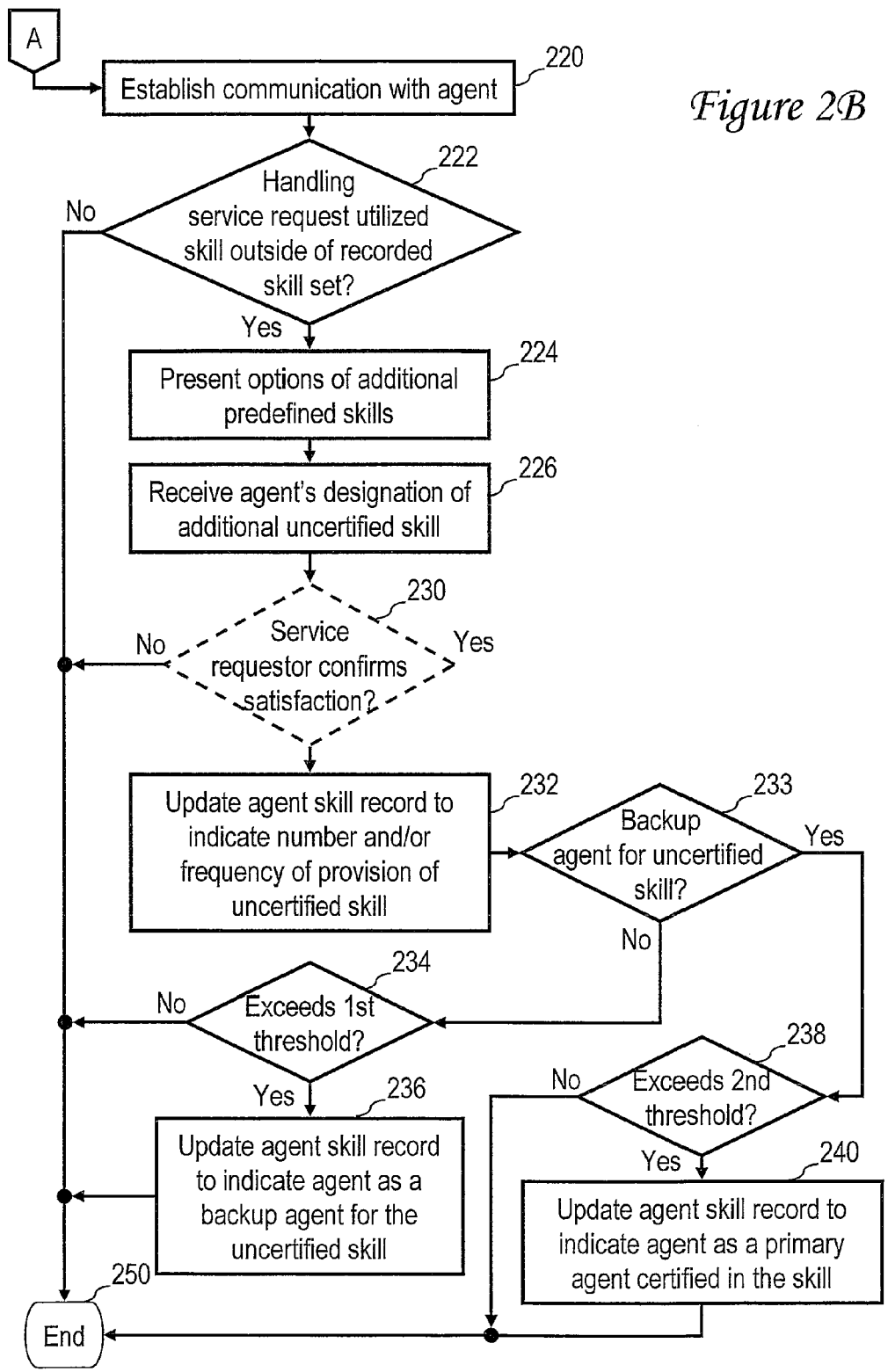
FIG. 2B depicts operation of a passive skill certification system in accordance with one embodiment.

Referring now to FIG. 2B, there is depicted a high level logical flowchart of the operation of a passive skill certification system (PSCS) 114 in accordance with one embodiment. The process shown in FIG. 2B begins at page connector A, for example, at the conclusion of the provision of service by an agent at block 216 of FIG. 2A, and then proceeds to block 220. Block 220 depicts PSCS 114, which preferably comprises program code executing on data processing system 106, establishing voice and/or data communication with the agent terminal 132 utilized to provide services at block 216, for example, by establishing voice communication via IVR system 110 or by establishing an instant messaging or web session.

Via the communication between data processing system 106 and the agent terminal 132, data processing system 106 queries the agent regarding whether handling the most recent service request utilized a skill that is not a member of the skill set associated with the agent in agent database 120 (block 222). For instance, returning the to a previous example in the financial services industry, the agent certified in the provision of home lending services, but not certified in depository or credit card accounts may report provision of additional services regarding depository or credit card accounts in handling the service request. If the agent does not report provision of services outside of the skill set associated with the agent by agent database 120, the process depicted in FIG. 2B terminates at block 250. If, on the other hand, the agent reports provision of services outside of the skill set associated with the agent by agent database 120, the process proceeds to block 224.

Block 224 illustrates PSCS 114 presenting via agent terminal 132 a plurality of predefined skills for which agent database 120 does not record a certification for the agent. At block 226, PSCS 114 receives from the agent terminal 132 the agent's designation of a predefined skill among those presented via agent terminal 132 in which the agent is not certified, but nevertheless utilized to handle the most recent service request.

As indicated by dashed line illustration of block 230, PSCS 114 may optionally require confirmation by the service requester of satisfaction of the service provided by the agent in general and/or in the predefined skill identified by the agent at block 226. As with the other communication with the service requester, the confirmation of satisfaction can be solicited via either voice communication with requester device 102 driven by IVR system 110 or via data communication with requester device 102. In embodiments in which optional block 230 is implemented, the process may terminate at block 250 absent confirmation of satisfaction by the service requester. In embodiments in which the confirmation of requester satisfaction depicted at block 230 is omitted or in cases in which confirmation of requester satisfaction is received, the process proceeds to block 232.

At block 232, PSCS 114 updates the agent skill record of the agent in agent database 120 to indicate the number of times that the agent has provided service utilizing the skill in which the agent is not certified and/or the frequency of the agent's provision of service utilizing the skill (e.g., in terms of service requests or time). Additionally, PSCS 114 determines at block 233 whether or not the agent skill record in agent database 120 currently identifies the agent as a backup agent for the skill in which the agent is not certified. If so, the process proceeds to block 238, which is described below. If, however, PSCS 114 determines at block 233 that agent database 120 does not currently identify the agent as a backup agent for the skill in which the agent is not certified, the process passes to block 234.

Block 234 depicts PSCS 114 comparing utilization of the skill by the agent to a first threshold, for example, by determining whether or not the number of times that the agent has provided service utilizing the skill in which the agent is not certified and/or the frequency of provision of such service by the agent exceeds the first threshold. If not, the process depicted in FIG. 2B terminates at block 250. If, however, a favorable or affirmative determination is made at block 234, PSCS 114 updates the agent skill record of the agent in agent database 120 to identify the agent as a backup agent for the skill in which agent remains uncertified. Thus, based upon the number of times that the agent has provided service utilizing the skill in which the agent is not certified and/or the frequency of provision of such service, the agent's on-the-job training in the skill is recognized and leveraged for potentially servicing future service requests. Following block 236, the process illustrated in FIG. 2B terminates at block 250.

Referring now to block 238, in response to a determination that the agent is already designated by agent database 120 as a backup agent for the skill in which the agent is not certified, PSCS 114 compares utilization of the skill by the agent to a second threshold, for example, by determining whether or not the number of times that the agent has provided service utilizing the skill in which the agent is not certified and/or the frequency of provision of such service by the agent exceeds the second threshold. If not, the process depicted in FIG. 2B terminates at block 250. If, however, a favorable or affirmative determination is made at block 238, PSCS 114 updates the agent skill record of the agent in agent database 120 to identify the agent as a primary agent for the skill (e.g., by adding the agent to a skill group 130 comprising agents possessing the skill) and to indicate that the agent is now certified in the skill Thus, based upon the number of times that the agent has provided service utilizing the skill and/or the frequency of provision of such service, the agent's on-the-job training in the skill is recognized by a passive certification and therefore leveraged for potentially servicing future service requests. Following block 240, the process illustrated in FIG. 2B terminates at block 250.

Figure 3A:
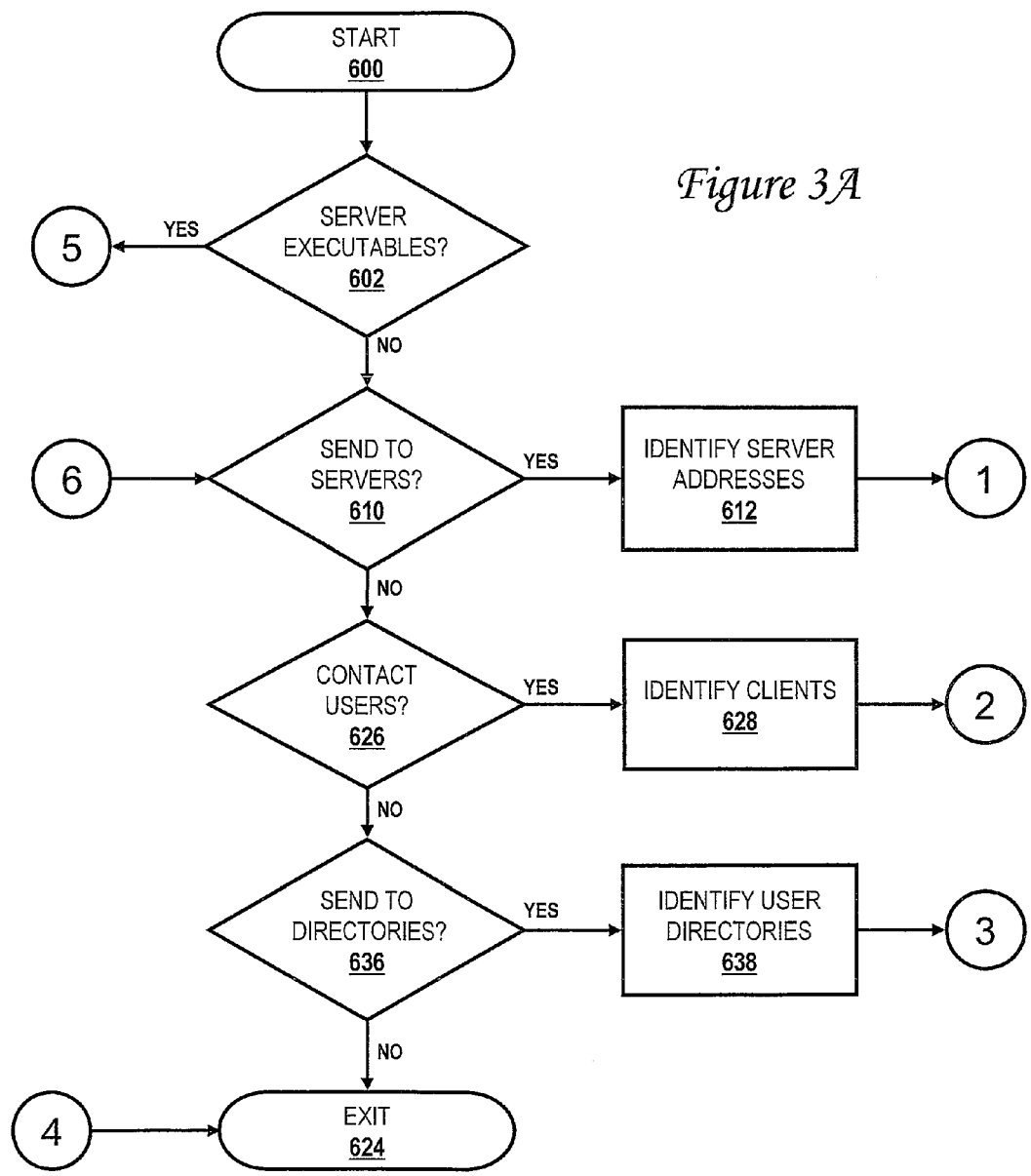
FIGS. 3A-3B are high level logical flowcharts showing steps taken to deploy software capable of executing the steps shown in FIGS. 2A-2B.
Figure 3B:
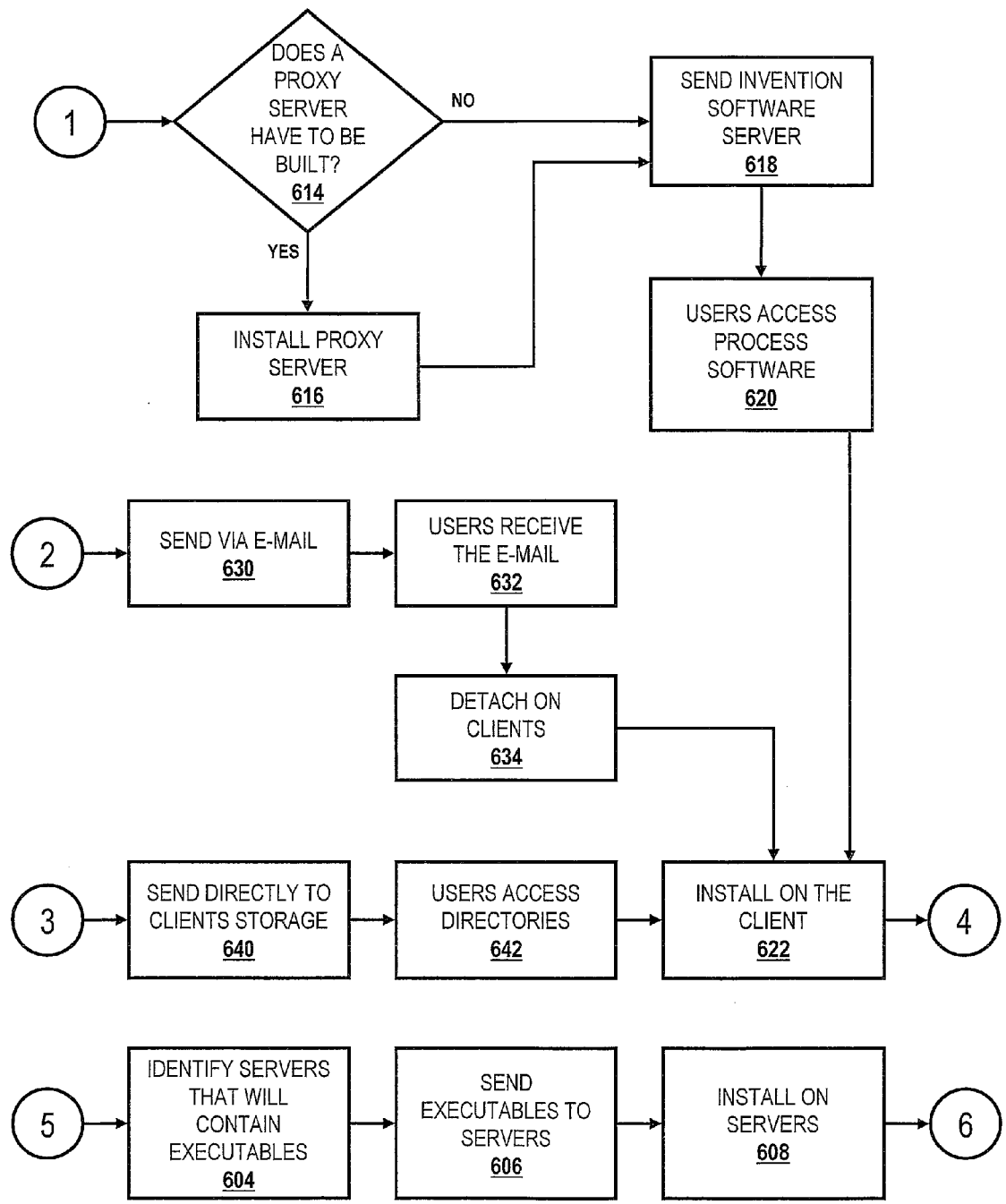

It should be appreciated that the processes described herein, and in particular as shown in FIGS. 2A-2B, can be deployed as process software. Referring now to FIGS. 3A-3B, step 600 begins an exemplary deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 4A:
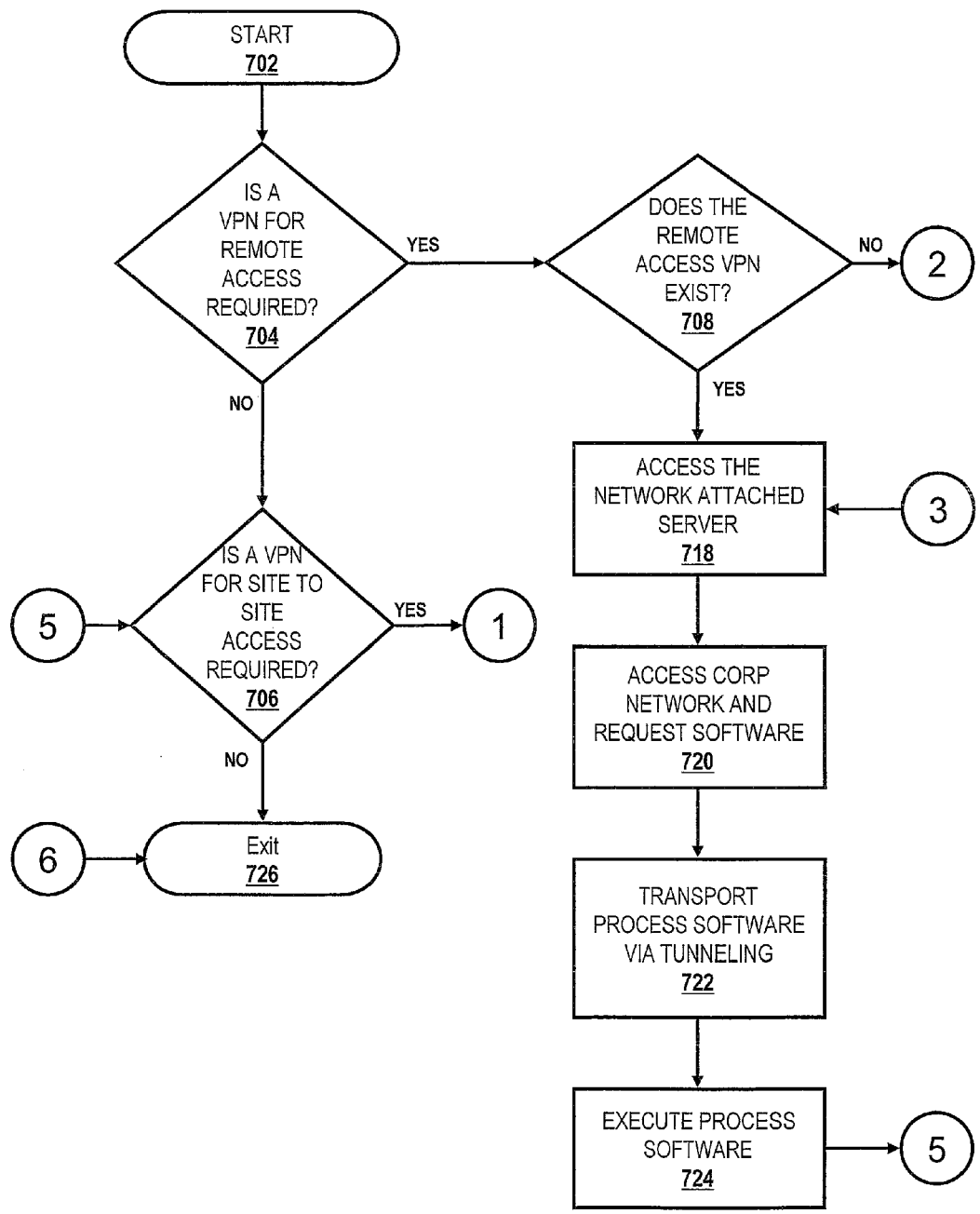
FIGS. 4A-4C are high level logical flowcharts showing steps taken to deploy in a Virtual Private Network (VPN) software that is capable of executing the steps shown in FIGS. 2A-2B.
Figure 4B:
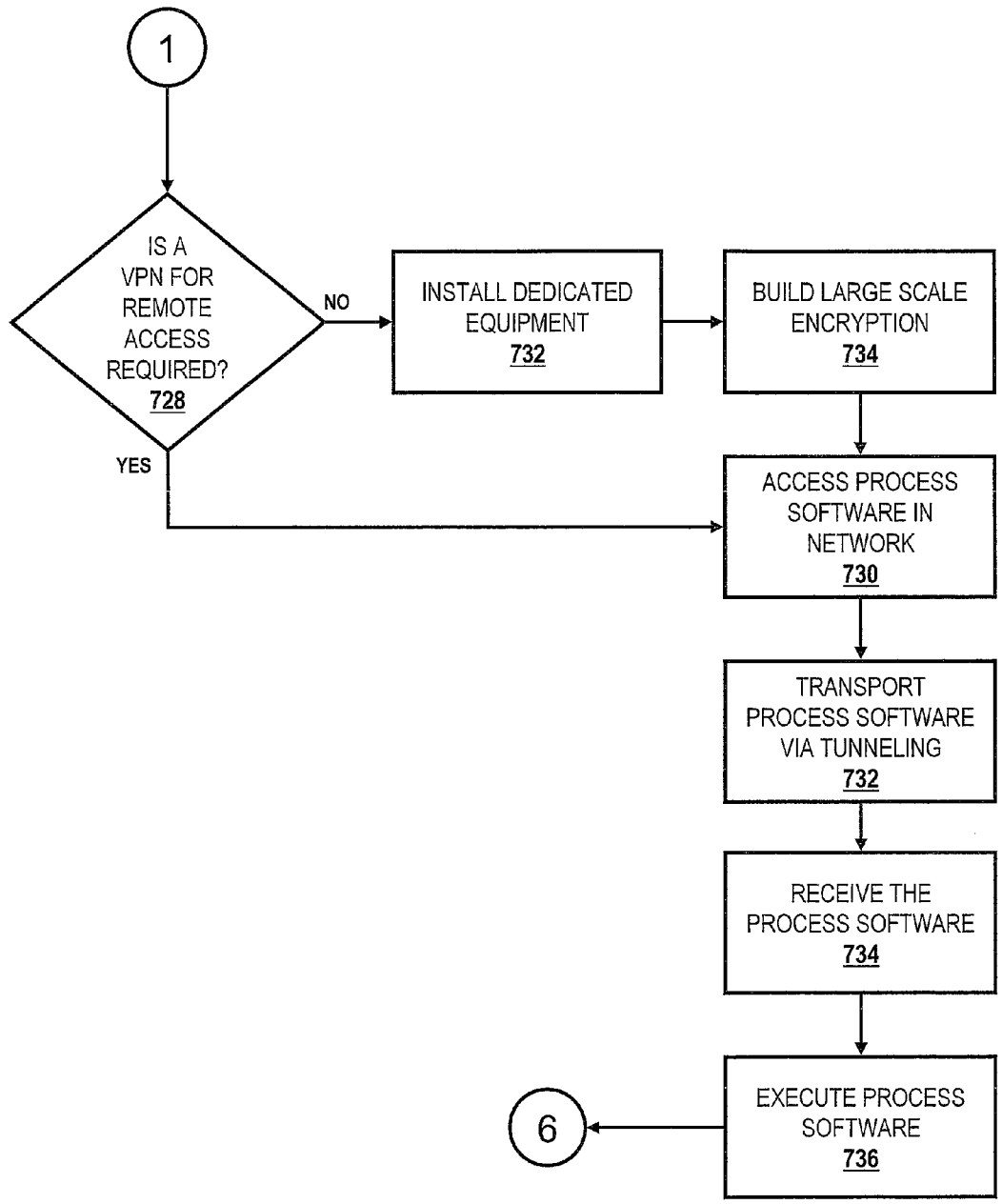
Figure 4C:
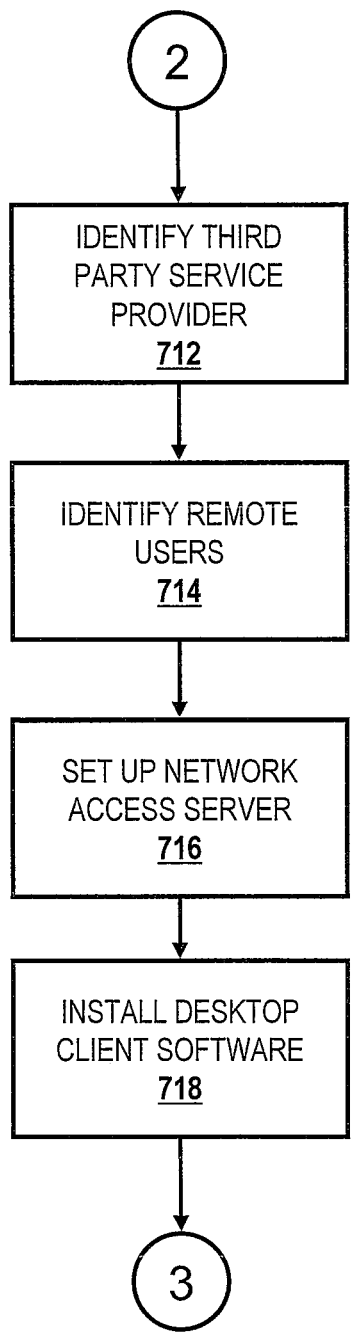

An exemplary process for such VPN deployment is depicted in FIGS. 4A-4C. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desktop, it is removed from the packets, reconstituted and then is executed on the remote users desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 732). Then build the large scale encryption into the VPN (block 734).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which comprises code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 5A:
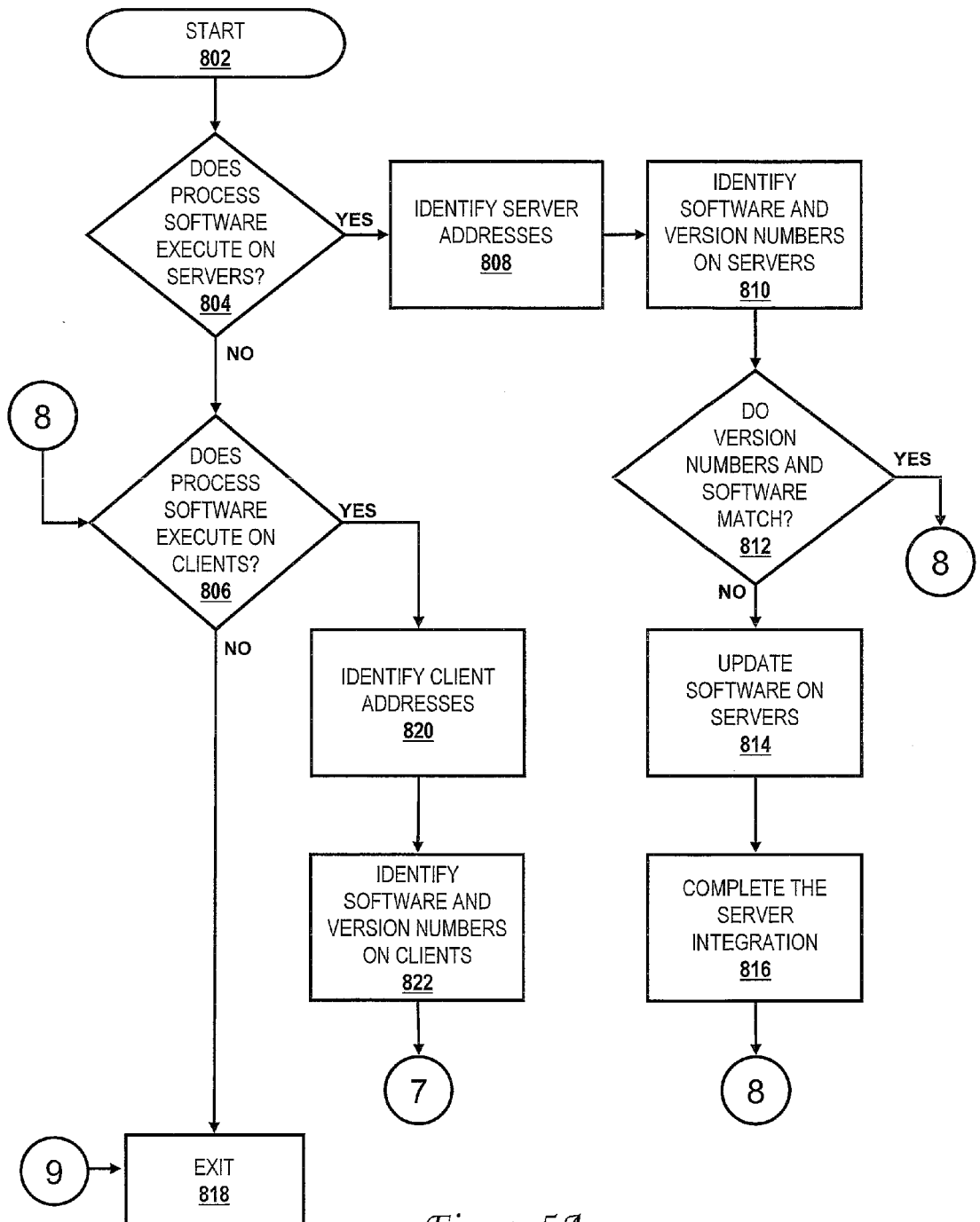
FIGS. 5A-5B are high level logical flowcharts showing steps taken to integrate into an computer system software that is capable of executing the steps shown in FIGS. 2A-2B.
Figure 5B:
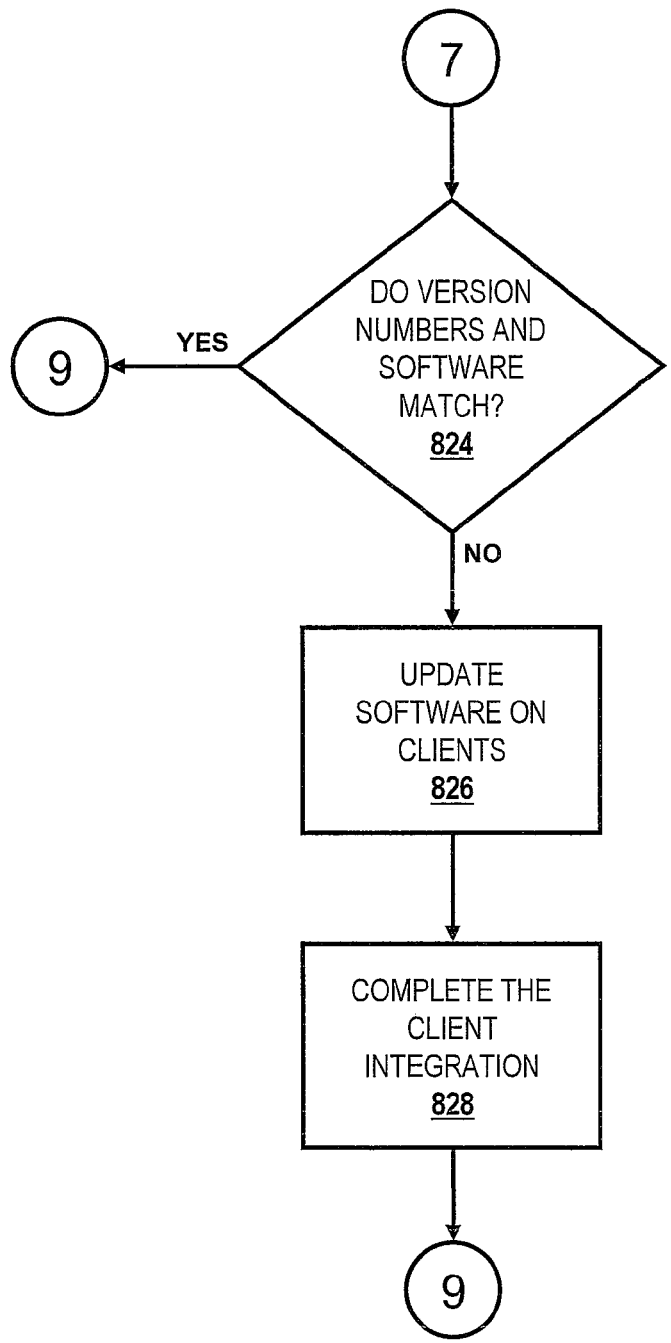

For a high-level description of an exemplary embodiment of this process, reference is now made to FIGS. 5A-5B. Initiator block 802 begins the integration of the process software. The first thing is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and Network Operating Systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally if there is missing required software, then it is updated on the server or servers in the step shown in block 814. The server integration is completed by installing the process software (block 816).

The step shown in query block 806, which follows either the steps shown in block 804, 812 or 816, determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, or hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
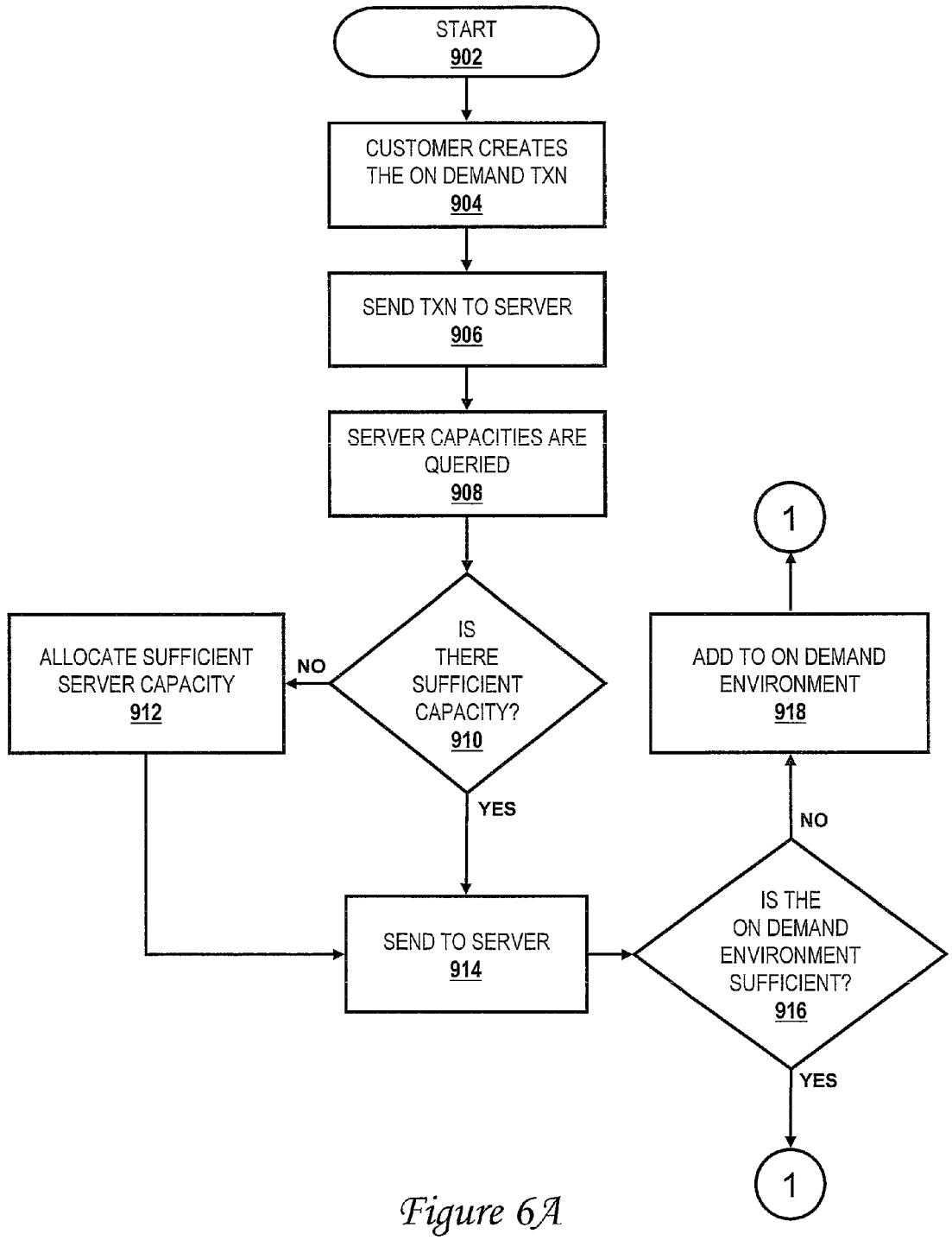
FIGS. 6A-6B are high level logical flowcharts showing steps taken to execute the steps shown in FIGS. 2A-2B using an on-demand service provider.
Figure 6B:
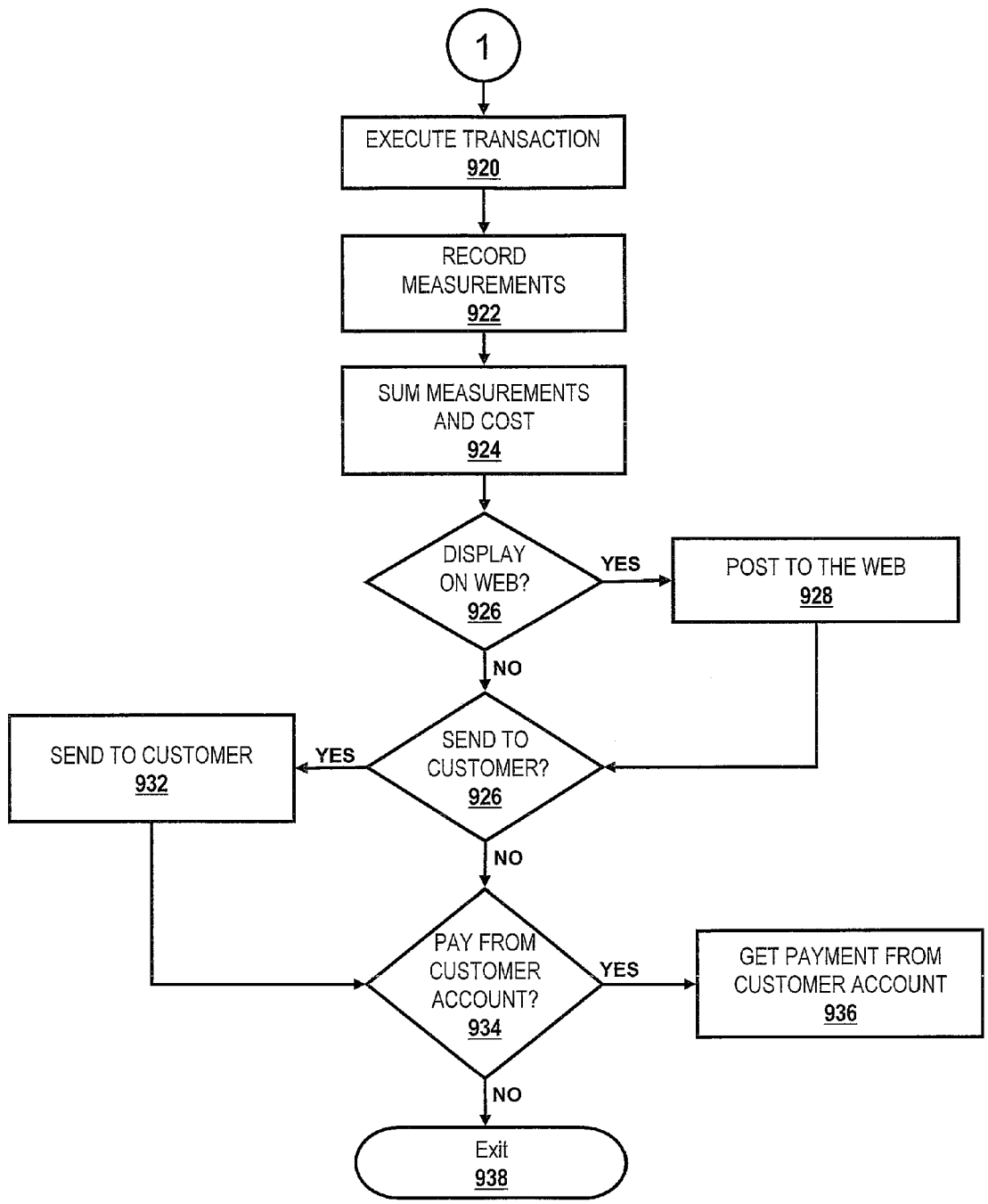

With reference now to FIGS. 6A-6B, initiator block 902 begins an exemplary On Demand process. A transaction is created than contains the unique customer identification, the requested service type and any service parameters that further specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While various embodiments have been particularly shown and described, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer-readable storage medium storing program code that can be processed by a data processing system to perform the described processes.

What is claimed is:

1. A method of data processing in a data processing system, comprising:
   in a data processing system coupled for communication to a plurality of agent terminals, receiving from an agent terminal a first message indicating that an agent associated with the agent terminal handled a service request utilizing a skill in which the agent is not indicated as certified by an agent database of the data processing system;
   in response to receipt of the first message:
      the data processing system receiving from the agent terminal a second message including a selection of at least one predefined skill of a plurality of predefined skills presented to an agent of the agent terminal, wherein the selected at least one predefined skill has been utilized by the agent in handling the service request, and wherein the selected at least one predefined skill is a predefined skill in which the agent is not certified; and
   the data processing system updating in the agent database an agent skill record indicative of an amount of utilization of the skill by the agent in handling service requests;
   the data processing system comparing the amount of utilization of the skill by the agent to a threshold;
   in response to a favorable comparison, the data processing system updating the agent skill record to indicate certification of the agent in the skill; and
   the data processing system performing skill-based routing in a contact center by reference to the agent skill record.

2. The method of claim 1, and further comprising:
   in response to the favorable comparison, updating the agent skill record to further designate the agent as a primary agent to which service requests to be serviced utilizing the skill are routed.

3. The method of claim 1, wherein:
   the threshold is a second threshold;
   the method further comprises:
      the data processing system comparing the amount of the utilization of the skill by the agent to a first threshold;
      in response to a favorable comparison to the first threshold, the data processing system updating the agent skill record to indicate that the agent is a backup agent that is uncertified in the skill and that a service request to be handled utilizing the skill can be routed to the agent if a primary agent certified in the skill is unavailable.

4. The method of claim 3, wherein performing skill-based routing includes:
   if the primary agent certified in the skill is unavailable, the data processing system routing a subsequent service request to the agent for handling based upon the agent skill record indicating the agent is a backup agent.

5. The method of claim 1, wherein the updating is performed only in response to receipt of confirmation of satisfaction of a service requester with provision of the service by the agent in response to the service request.

6. The method of claim 1, and further comprising:
in response to completion of handling of a service request routed to the agent terminal, the data processing system transmitting to the agent terminal a message requesting designation by the agent of at least one predefined skill in which the agent is not certified as having been utilized by the agent in handling the service request.

7. A data processing system, comprising:
processing resources;
data storage including an agent database;
a communication system supporting communication with a plurality of agent terminals of a contact center;
a passive skill certification system that, responsive to receiving from an agent terminal a first message indicating that an agent associated with the agent terminal handled a service request utilizing at least one skill in which the agent is not indicated as certified by the agent database, receives a second message includes a selection of the at least one skill from a plurality of predefined skills presented to an agent of the agent terminal, updates in the agent database an agent skill record indicative of an amount of utilization of the skill by the agent in handling service requests, and if the amount of utilization of the skill by the agent compares favorably to a threshold, updates the agent skill record to indicate certification of the agent in the skill; and
a skill-based router that routes incoming service requests to the plurality of agent terminals by reference to the agent database.

8. The data processing system of claim 7, wherein the passive skill certification system, in response to the favorable comparison, updates the agent skill record to further designate the agent as a primary agent to which service requests to be serviced utilizing the skill are routed.

9. The data processing system of claim 7, wherein:
the threshold is a second threshold; and
the passive skill certification system compares the amount of the utilization of the skill by the agent to a first threshold, and in response to a favorable comparison thereto, updates the agent skill record to indicate that the agent is a backup agent that is uncertified in the skill and that a service request to be handled utilizing the skill can be routed to the agent if a primary agent certified in the skill is unavailable.

10. The data processing system of claim 9, wherein the skill-based router, if the primary agent certified in the skill is unavailable, routes a subsequent service request to the agent for handling based upon the agent skill record indicating the agent is a backup agent.

11. The data processing system of claim 7, wherein the passive skill certification system updates the agent skill record only in response to receipt of confirmation of satisfaction of a service requester with provision of the service by the agent in response to the service request.

12. The data processing system of claim 7, wherein the passive skill certification system, responsive to completion of handling of a service request routed to the agent terminal, transmits to the agent terminal a message requesting designation by the agent of at least one predefined skill in which the agent is not certified as having been utilized by the agent in handling the service request.

13. A program product, comprising:
a computer-readable storage medium; and
a passive skill certification system embodied within the computer-readable storage medium and executable by a data processing system to cause the data processing system, responsive to receiving from an agent terminal a first message indicating that an agent associated with the agent terminal handled a service request utilizing at least one skill in which the agent is not indicated as certified by the agent database, to receive a second message includes a selection of the at least one skill from a plurality of predefined skills presented to an agent of the agent terminal, to update in the agent database an agent skill record indicative of an amount of utilization of the skill by the agent in handling service requests, and if the amount of utilization of the skill by the agent compares favorably to a threshold, to update the agent skill record to indicate certification of the agent in the skill, such that subsequent service requests can be routed for handling by the agent by reference to the updated agent skill record.

14. The program product of claim 13, wherein the passive skill certification system, in response to the favorable comparison, causes the data processing system to update the agent skill record to further designate the agent as a primary agent to which service requests to be serviced utilizing the skill are routed.

15. The program product of claim 13, wherein:
the threshold is a second threshold; and
the passive skill certification system causes the data processing system to compare the amount of the utilization of the skill by the agent to a first threshold, and in response to a favorable comparison thereto, to update the agent skill record to indicate that the agent is a backup agent that is uncertified in the skill and that a service request to be handled utilizing the skill can be routed to the agent if a primary agent certified in the skill is unavailable.

16. The program product of claim 15, and further comprising:
a skill-based router that routes service requests to a plurality of agent terminals, wherein the skill-based router, if the primary agent certified in the skill is unavailable, routes a subsequent service request to the agent for handling based upon the agent skill record indicating the agent is a backup agent.

17. The program product of claim 13, wherein the passive skill certification system causes the data processing system to update the agent skill record only in response to receipt of confirmation of satisfaction of a service requester with provision of the service by the agent in response to the service request.

18. The program product of claim 13, wherein the passive skill certification system, responsive to completion of handling of a service request routed to the agent terminal, causes the data processing system to transmit to the agent terminal a message requesting designation by the agent of at least one predefined skill in which the agent is not certified as having been utilized by the agent in handling the service request.

19. The program product of claim 13, wherein the passive skill certification system is deployed to a server from a remote location.

20. The program product of claim 13, wherein the passive skill certification system is provided by a service provider to a customer on an on-demand basis.

* * * * *